United States Patent [19]
Garland et al.

[11] 4,285,576
[45] Aug. 25, 1981

[54] LIGHT GATING METHODS AND APPARATUS

[75] Inventors: Thomas H. Garland, El Monte; Michael T. Zimmerman, Arcadia, both of Calif.

[73] Assignee: Bell & Howell Company, Chicago, Ill.

[21] Appl. No.: 36,489

[22] Filed: May 7, 1979

[51] Int. Cl.³ .............................................. G02F 1/03
[52] U.S. Cl. .................... 350/387; 350/390; 365/117
[58] Field of Search ............... 350/150, 159, 354, 356, 350/363, 387, 365, 390; 365/109, 117; 358/61

[56] References Cited

U.S. PATENT DOCUMENTS

| | | | |
|---|---|---|---|
| 2,852,330 | 9/1958 | Stufflebeam et al. | 350/159 |
| 3,930,119 | 12/1975 | Schmidt et al. | 350/150 |

FOREIGN PATENT DOCUMENTS

1534027  11/1978  United Kingdom ..................... 350/150

OTHER PUBLICATIONS

Sakuma et al., "A New Operating Method for PLZT Devices", Nec. Research & Development #42, 7-1976, pp. 32-39.
Rouchon et al., "Photoinduced Changes of Refractive Index in PLZT Ceramics", Ferroelectrics, 1976, pp. 389-391.
Krumins et al., "Optically Induced Birefringenge Change in La-Doped Lead Zirconate-Titanate Ferroelectric Ceramics, Ferroelectrics", 1978, pp. 21-26.
Cutchen et al., "Electrooptic Devices Utilizing Quadratic PLZT Ceramic Elements", 1973 Wescon Tech. Papers, vol. 17, Sec. 30, pp. 1-11.
Cutchen et al., "PLZT Electrooptic Shutters: Applications", Applied Optics, vol. 14, 8-1975, pp. 1866-1873.
Levanyuk et al., "Theory of Photoinduced Changes in Refractive Index & Spontaneous Polarization", Ferroelectrics, vol. 18, 1978, pp. 147-151.
Micheron et al., "Holographic Storage in Quadratic PLZT Ceramics", Jr. Amer. Ceramic Soc., vol. 57, pp. 306-308.
Micheron et al., "Optical Recording of Digital Data in PLZT Ceramics", App. Physics Lett., vol. 24, 6-1974, pp. 605-607.
Kamzina et al., "Photoinduced Phenomena in Lead Magnesium Niobate Crystal at the Diffuse Phase Transition", Ferroelectrics 1978, pp. 113-116.

*Primary Examiner*—William H. Punter
*Attorney, Agent, or Firm*—Benoit Law Corporation

[57] ABSTRACT

Light is selectively gated with an array of electrically switchable illuminated light gates in an electrooptically active solid-state material displaying field-induced and photoinduced birefringence between a light polarizer and a complementary light analyzer. The illuminated light gates are selectively switched through field-induced birefringence by selective application of externally provided electric potentials, until photoinduced birefringence occurs in the light gate array. Such photoinduced birefringence is neutralized by illuminating the light gates in circumvention in either the polarizer or the analyzer while maintaining externally provided electric potentials away from the light gates.

6 Claims, 3 Drawing Figures

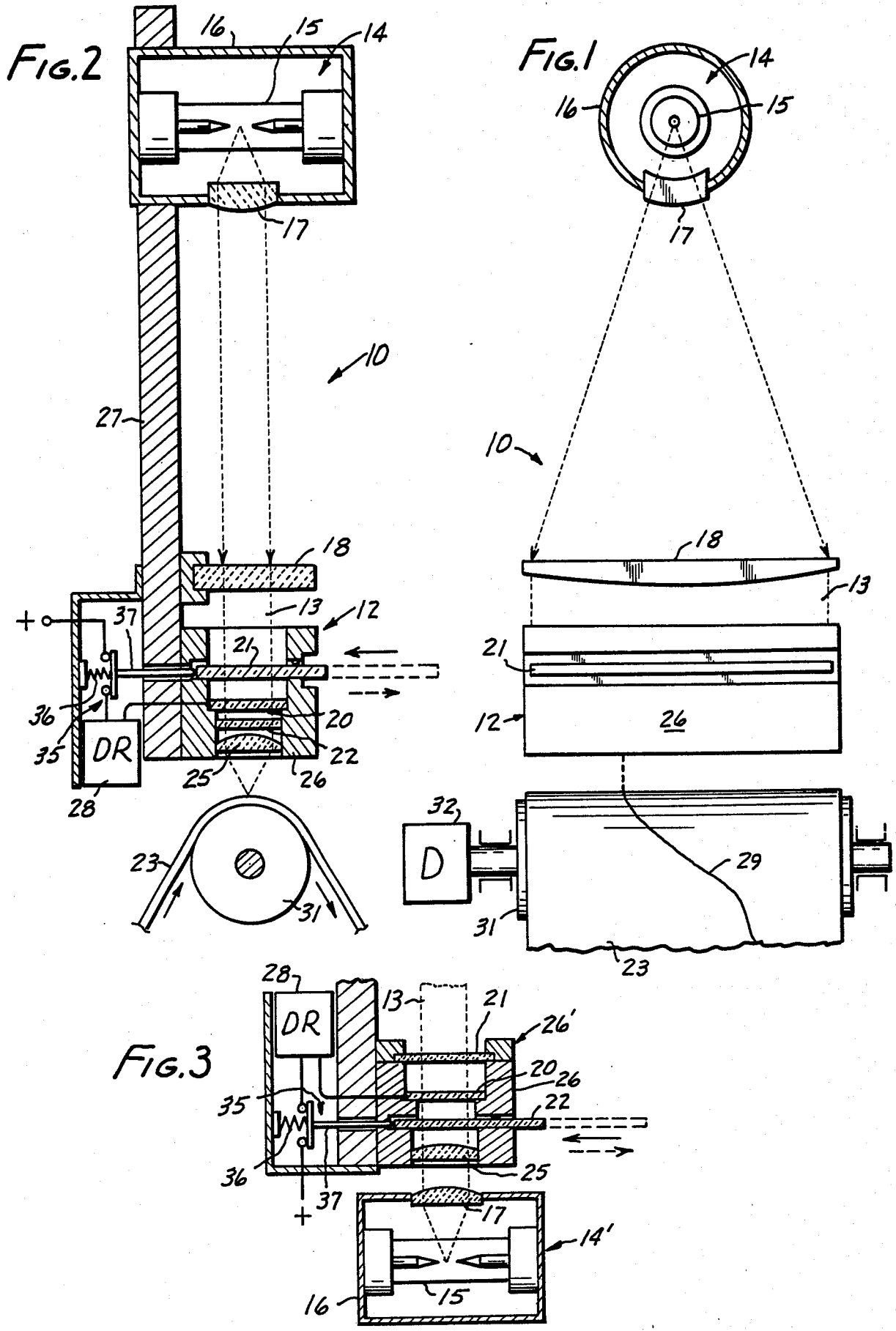

LIGHT GATING METHODS AND APPARATUS

BACKGROUND OF THE INVENTION

1. Field of the Invention

The subject invention relates to electrooptical gating systems and also to the recording of electric signals and, more specifically, to methods and apparatus for selectively gating light with an array of electrically switchable light gates.

2. Disclosure Statement

This disclosure statement is made pursuant to the duty of disclosure imposed by law and formulated in 37 CFR 1.56(a). No representation is hereby made that information thus disclosed in fact constitutes prior-art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material.

The photosensitive component, such as the silver halide system, used in photosensitive oscillograph papers or other photographic materials, has its highest sensitivity in the far blue and ultraviolet range; that is, at wavelengths below 475 nm (nanometers). Of course, photographic materials are frequently sensitized by dyes or otherwise rendered panchromatic to have a light sensitivity above the basic sensitivity of the photosensitive component. However, especially in the case of photosensitive oscillograph papers or other photographic recording media, the far blue and ultraviolet region is frequently relied on for high-sensitivity response.

In practice, such preference as to the recording medium is paired with a growing choice of the mercury arc lamp as light source for oscillograph apparatus and other light recording equipment. In fact, the mercury arc lamp which strongly radiates in the blue and ultraviolet region and photosensitive paper having a basic sensitivity in the same region, form a team in practice in a large number of oscillograph and other light recording apparatus.

In the context of oscillograph and other light recording apparatus, use has recently been made of electrooptically active solid-state materials for selectively gating light to the recording medium.

In this respect, various electrooptical light gate systems have been proposed for diverse fields of utility. For instance, an article by J. Thomas Cutchen et al, entitled Electrooptic Devices Utilizing Quadratic PLZT Ceramic Elements, published in 1973 WESCON TECHNICAL PAPERS, Vol. 17, part 30, pp. 30/2 et seq., and an article by the same authors entitled PLZT Electrooptic Shutters: Applications, APPLIED OPTICS, Vol. 14, No. 8 (August 1975), pp. 1866 et seq., describe electrooptic ceramics and devices employing transparent lanthanum-modified lead zirconate titanate (PLZT), and applications thereof, including page composers, display devices, eye protection devices, industrial welding protection, large aperture photographic shutters and variable density filters. Reference is also made to the extensive bibliography of these two articles, hereby incorporated by reference herein.

Facsimile apparatus for writing and reading mechanically moving documents with an electronically controllable switching mask plate, disposed between polarization filters and consisting of a material containing mixed crystals of lead zirconate and lead titanate, and doped with lanthanum, and provided with aligned electrodes, was proposed in U.S. Pat. No. 3,930,119, by Rolf Schmidt et al, issued Dec. 30, 1975.

A further proposal is apparent from British patent specification No. 1,534,027, by Battelle Memorial Institute, published Nov. 29, 1978. That proposal employs electrooptical light modulating devices preferably made of a PLZT ceramic material.

Improved light gate utilization methods and apparatus, with special optical systems, were disclosed in German Patent Publication No. 28 09 997, filed by the subject assignee, published Sept. 21, 1978, and herewith incorporated by reference herein.

Radically different from these proposals to employ PLZT and similar electrooptically active solid-state materials for light gating purposes are proposals to employ such materials for optical information storage or recording, with the particular material constituting the storage or information recording medium itself.

Reference may in this respect be had to an article by F. Micheron et al, entitled Holographic Storage in Quadratic PLZT Ceramics, JOURNAL OF THE AMERICAN CERAMIC SOCIETY, Vol. 57, No. 7, pp. 306–08, an article by F. Micheron et al, entitled Optical Recording of Digital Data in PLZT Ceramics, APPLIED PHYSICS LETTERS, Vol. 24, No. 12 (June 1974), pp. 605–07, an article by J. M. Rouchon et al, entitled Photoinduced Changes of Refractive Index in PLZT Ceramics, FERROELECTRICS, Vol. 11 (1976), pp. 389–92, an article by A. E. Krumins et al, entitled Optically Induced Birefringence Change in La-Doped Lead Zirconate-Titanate Ferroelectric Ceramics, FERROELECTRICS, Vol. 18 (1978), pp. 21–26, an article by L. S. Kamzina et al, entitled Photoinduced Phenomena in Lead Magnesium Niobate Crystal at the Diffuse Phase Transition, FERROELECTRICS, Vol. 18 (1978), pp. 113–16, and an article by A. P. Levanyuk et al, entitled Theory of Photoinduced Changes in Refractive Index and Spontaneous Polarization, FERROELECTRICS, Vol. 18 (1978), pp. 147–51.

In their above mentioned articles, Micheron et al and Rouchon et al report on techniques for holographic storage and optical recording in PLZT ceramics through photoinduced birefringence, and for an erasure of such recordings or of the photoinduced birefringence through illumination of the PLZT sample in the absence of an applied electric field. In particular, Micheron et al have pointed out that optical erasure with no external field applied may be considered as a second recording. Krumins, Kamzina, Levanyuk et al report on similar experiments and supply theoretical explanations.

In the manufacture of PLZT electroded wafers, a suspension of light gating properties was observed when the wafers were subjected to ultraviolet exposure for cleaning purposes. This so-called "temporary UV blindness" disappeared upon annealing at 100° C. for one hour.

Prior to the subject invention, no connection was apparent between the above mentioned observations and theories on the one hand and a reduction of the light transmission of electrooptical solid-state light gates, particularly of the PLZT or ferroceramic type, upon prolonged operation, on the other hand.

Rather, the rule of thumb developed that the interelectrode spacing, that is, the spacing between immediately adjacent electrodes, should not be smaller than the thickness of the layer of electrooptically active material. It now appears in retrospect that the latter relationship provided a favorable distribution of the applied electric fields throughout the thickness of the electrooptically active material, thereby reducing what has now been recognized as photoinduced birefringence. However, the latter rule of thumb has continued to place severe restrictions on a reduction of interelectrode spacing for a given thickness of the electrooptically active substrate or layer, impeding attainment of desirable properties, such as high resolution.

SUMMARY OF THE INVENTION

It is a general object of this invention to overcome the disadvantages and to meet the needs apparent from the above Disclosure Statement or from other parts hereof.

It is a related object of this invention to provide improved methods and apparatus for selectively gating light with an array of electrically switchable light gates.

It is a germane object of this invention to provide improved methods and apparatus for recording electric signals or other information on a light sensitive recording medium with the aid of electrically switchable light gates.

It is also an object of this invention to neutralize photoinduced birefringence in electrooptical solid-state light gates, such as lanthanum modified lead zirconate titanate (PLZT) light gates operating with polarized light.

It is also an object of this invention to permit an increase in resolution of electrically switchable solid-state light gates.

Other objects will become apparent in the further course of this disclosure.

The subject invention resides in methods and apparatus for selectively gating light with an array of electrically switchable light gates in an electrooptically active solid-state material, such as a lanthanum modified lead zirconate titanate (PLZT) ceramic, displaying field-induced and photoinduced birefringence between a light polarizer and a complementary light analyzer. Electric potentials are provided externally of the array of light gates for selectively switching such gates while they are being illuminated with light polarized by the polarizer. In particular, the thus illuminated light gates are selectively switched through field-induced birefringence by selective application of the externally provided electric potentials to the light gates, until photoinduced birefringence occurs in the light gate array. Such photoinduced birefringence is neutralized by removing either the polarizer or the analyzer and illuminating the light gates through the region where the polarizer or analyzer was located while maintaining the polarizer or analyzer removed and externally provided electric potentials away from the light gates.

BRIEF DESCRIPTION OF THE DRAWINGS

The subject invention and its objects and aspects will become more readily apparent from the following detailed description of preferred embodiments thereof, illustrated by way of example in the accompanying drawings, in which like reference numerals designate like or functionally equivalent parts, and in which:

FIG. 1 is an elevation of an electric signal recording apparatus pursuant to a preferred embodiment of the subject invention;

FIG. 2 is a longitudinal section through the apparatus of FIG. 1; and

FIG. 3 is a fraction of a longitudinal section of an electric signal recording apparatus according to a further embodiment of the subject invention.

DESCRIPTION OF PREFERRED EMBODIMENTS

The electric signal recording apparatus 10 of FIGS. 1 and 2 comprises a light gate assembly 12 illuminated by collimated light 13. By way of example, but not by way of limitation, reference may be had to assignee's above mentioned German Patent Publication No. 28 09 997, disclosing electrooptical light gate structures and arrangements, together with various means and methods for illuminating same with collimated light. In this respect, the apparatus of FIG. 1 by way of example employs a source of light 14 including for instance a mercury arc lamp 15 in a lamp housing 16. Uncollimated light proceeds from the lamp 15 via a curved cylinder or belt lens 17 to a collimator 18 which, by way of example, comprises a cylinder lens 18. The source 14 and collimator 18 thus illuminate the light gate assembly 12 with a band of light 13 extending across and along a light gate array 20 as taught, for instance, in the above mentioned German Patent Publication.

The array 20 comprises a plurality of electrically switchable light gates in an electrooptically active solid-state material displaying field-induced and photoinduced birefringence. Such a material is lanthanum modified lead zirconate titanate (PLZT). The light gates in the array 20 are located between a light polarizer 21 complementary light analyzer 22. When no electric field is applied to the array 20, the light gates ideally are optically isotropic and exhibit no birefringence.

Light 13 from the typically unpolarized source 14 is linearly polarized by the polarizer 21 and proceeds through the light gate material (herein briefly "PLZT material") at 20, to be blocked by the analyzer 22. On the other hand, if one or more electric having voltages or potentials are applied to the array 20, electric fields thus set up cause the PLZT material to become uniaxially birefringent. This birefringence causes a virtual rotation of the polarized light vector, thus allowing light to be transmitted via polarizer 21, light gate array 20 and analyzer 22 to a photosensitive recording medium or paper 23 in a manner known per se.

A lens or lens system 25 composed, for instance, of one or two elongate cylinder lenses, may be employed for focusing light traversing the analyzer 22 onto the recording paper 23.

A rigid beam 26 or similar supporting structure may be employed for mounting the light gate array 20 in the form of a substrate or chip consisting, for instance, of electrooptically active PLZT light gate material, or having a layer of such material disposed on a transparent substrate. The lamp housing 16 and beam 26 may be mounted on a baseplate 27.

Electric potentials for selectively switching the light gates are provided or generated externally of the array 20 in electronic driver apparatus 28 containing the requisite light gate driver circuits and components.

As shown in several of the above mentioned references, herewith incorporated by reference herein, electrode arrays may, for instance, be arranged in single aperture gate or dual aperture gate fashion on or in the PLZT material, and may be connected by jumpers or wires to the driver circuits 28, shown only symbolically in FIGS. 2 and 3.

In practice, the light gate arrays 20 are illuminated with collimated light 13 polarized at 21 and illuminated light gates are selectively switched through field-induced birefringence by selective application of electric signals or potentials produced externally of the arrays 20 by circuitry associated with the driver 28. Light thus gated pursuant to the above mentioned polarization principles traverses the analyzer 22 and focusing lens 22 to impinge upon the recording paper 23 where it will leave a visible trace 29 either after photographic development or practically immediately in the case of direct recording paper. In addition to oscillograph-type of recording, alphanumeric and facsimile-type recording is possible with the type of apparatus shown in FIGS. 1 and 2. The recording medium or paper 23 is advanced continuously or intermittently past the recording station by or with the aid of a paper drum 31 which may be driven by a motor 32.

In operating equipment of the type shown in FIGS. 1 to 3, a performance degradation with time has been observed, which frequently diminishes the light output of the apparatus, or the through-put of the electrooptic arrays, to as much as 50% of its original value in one hour of operation or less, and to even lower values thereafter.

While no limitation to or dependence on any particular theory is intended, it is presently believed that the major cause of this performance degradation is light-induced or photoinduced birefringence. Such photoinduced birefringence, in turn, is believed to be due to photoexcitation of electrons in the illuminated region where electrons can reach the conduction state and drift under the influence of the applied field. Such photoinduced charge carriers are being trapped in the dark regions of the electrooptical material layer of the array 20, particularly in close proximity to the edges of the electrode deposits. In brief, the tapped photoinduced charge carries generate a space charge field which acts against the field applied to the electrodes and gating regions. The localized charge at the boundary of the illuminated area grows at a rate proportionate to the difference of free carrier concentration in the illuminated and in the dark areas.

According to the subject invention, the above mentioned photoinduced birefringence or, more broadly, performance degradation with time is neutralized by illuminating the light gates or array 20 in circumvention of either the polarizer 21 or the analyzer 22 while maintaining externally provided electric potentials away from the light gates.

For instance, as shown in FIGS. 1 and 2, the beam 26 removably mounts the light polarizer 21 in a first region for polarizing light 13 from the source 14 for illumination of the light gates 20. The beam 26 also situates the analyzer 22 in a second region which is spaced from the first region, and further mounts the array 20 between such first and second regions. As seen in FIGS. 1 and 2, the polarizer 21, or a frame thereof, laterally projects from the mounting beam 26. Means are thus provided in conjunction with the beam 26 for temporarily removing the polarizer from the mentioned first region for illumination of the light gates 20 with light 13 from the source 14 in circumvention of the polarizer 21.

In particular, as indicated by the dotted outline and arrow at the polarizer 21 in FIG. 2, such polarizer may be removed from, or slid out of, the light admitting aperture of the mounting beam 26. In this manner, the light gates in the array 20 are illuminated by unpolarized light from the source 14. Such unpolarizer illumination typically has a higher intensity than the illumination effected through the polarizer 21 during normal operation of the equipment. In this respect, it is not generally necessary to increase the intensity of the light emitted by the source 14, since the temporary removal of the polarizer 21 according to the preferred embodiment illustrated in FIGS. 1 and 2 will subtract from the path of the light 13 the light losses incurred in the polarizer 21 during normal operation of the equipment.

During neutralization of photoinduced birefringence, no externally generated electric fields are applied to the light gates or array 20. Rather, the above mentioned electric signals or potentials are kept and maintained away from the light gates while the polarizer 21 is maintained removed from the mentioned first region or light aperture of the beam 26.

To this end, and by way of example, the illustrated preferred embodiment includes a switch 35 which is biased to an open position by a spring 36. Upon insertion of the polarizer 21 in the direction of the solid arrow shown in FIG. 2, the polarizer 21 or a mounting frame thereof engages an actuating rod 37 of the switch 35. In this manner, the switch 35 is actuated to its closed position against the bias of the spring 36, and is maintained in such close position as long as the polarizer 21 is and remains completely inserted into the mounting beam 26 as shown in FIG. 2. Of course, the static friction of the polarizer 21 or of a mounting frame thereof, relative to the beam 26, is made sufficient to prevent the bias spring 26 from pushing the switch 35 to an open position as long as the polarizer is in place. The closed switch 35 thus enables the driver 28, either through energization from an external source symbolized by a plus (+) sign, or through completion of an internal circuit, to selectively energize and open the light gates in the array 20 under the command of its control circuitry.

On the other hand, if the polarizer 21 is removed in the direction of the dotted arrow shown in FIG. 2, the engagement between polarizer or polarizer frame or actuating rod 37 ceases and the bias spring 36 is able to open the switch 35. This suspends the capability of the circuit 28 to drive the light gates in the array 20, until the switch 35 is again closed through complete insertion of the polarizer 21.

In practice, it has been found that performance degradation to one-third or less of the initial light output of PLZT arrays could be completely reversed in a fraction of the degradation time by neutralizing illumination of the type herein described with reference to FIGS. 1 to 3.

In this respect, FIG. 3 shows an alternative method for achieving recovery of degraded light gate arrays in accordance with a further embodiment of the subject invention.

In particular, FIG. 3 shows the analyzer 22 removably mounted in the above mentioned second region by a slightly modified mounting beam 26'. The apparatus is operated for recording purposes in the same manner as described above with reference to FIGS. 1 and 2, except that the switch 36 is in FIG. 3 maintained closed against the bias of the spring 36 by the analyzer 22 or a mounting frame thereof.

Upon insertion of the analyzer 22 in the direction of the solid arrow shown in FIG. 3, the analyzer or a frame thereof engages the actuation rod 37 and closes the switch 35 against the bias of the spring 36. As in the case of FIGS. 1 and 2, closure of the switch 35 enables the circuitry 28 to drive the light gates in the array 20. For the normal operation of the light gating apparatus shown in FIG. 3, reference may be had to the above description of the normal operation of an apparatus of FIGS. 1 and 2, with the selectively actuated light gates in the array 20 being located between the crossed polarizer 21 and analyzer 22 for recording of information, such as in the form of a trace 29, on a photosensitive recording medium 23.

Of course, it should be recognized at this juncture that both the apparatus of FIGS. 1 and 2 and the apparatus of FIG. 3 could be used for purposes other than recording, such as for the reading of information with a selectively gated and shifted light spot or for the display of information by luminous outputs.

In all these endeavors, the above mentioned photoinduced birefringence or performance degradation with time occurs in the array 20. For a neutralization of these detrimental effects, the analyzer 22 is temporarily removed from the second region across the light aperture of the beam 26′. To this end, the analyzer 22 may be slid in the direction of the dotted arrow to its second position shown by a dotted outline in FIG. 3.

The electrooptic material or light gates in the array 20 are then illuminated through the mentioned second region in circumvention of the removed analyzer.

To this end, a light source 14′ corresponding to or being a duplicate of the light source 14 shown in FIGS. 1 and 2 may, as shown in FIG. 3, be substituted for the photosensitive paper 23 and paper support 31 at the recording station. Alternatively, mirrors may be employed to beam the light from the source 14 shown in FIGS. 1 and 2 backward through the lens 25 and onto the array 20. In either case, the switch 35 will be opened upon removal of the analyzer 22, thereby maintaining externally provided electric potentials away from the light gate during the circumventing illumination of the light gates.

The light gates 20 in the embodiments of FIG. 3 will thus be restored to their original light output or light through-put condition.

As a further benefit of the subject invention, the spacing between immediately adjacent electrodes 31 in the light gate array 15 may be made smaller than the thickness of the layer of electrooptically active material in the array 15, in order to provide for increased resolution. Any increased photoinduced birefringence resulting from such closer electrode spacing is easily erased by following the teachings of the subject invention, such as in the manner shown in FIG. 3.

The subject invention thus effictively removes the existing severe restriction mentioned at the end of the above Disclosure Statement. In other words, the subject invention enables a substantial increase in the resolution of light gate array and information recording produced thereby, relative to what was previously thought attainable.

The subject extensive disclosure will suggest or render apparent various modifications and variations within the spirit and scope of the subject invention to those skilled in the art.

We claim:

1. In a method of selectively gating light with an array of electrically switchable light gates, the improvement comprising in combination the steps of:
   providing said electrically switchable light gates in an electrooptically active solid-state material displaying field-induced and photoinduced birefringence;
   locating said light gates between a light polarizer situated in a first region and a complementary light analyzer situated in a second region;
   providing a source of light for illuminating said light gates;
   polarizing light from said source with said polarizer by emitting light from said source through said polarizer in said first region;
   providing electric potentials externally of said array of light gates for selectively switching said light gates;
   illuminating said light gates with said polarized light and selectively switching said illuminated light gates through field-induced birefringence by selective application of said electric potentials to said light gates until photoinduced birefringence occurs in said array;
   removing said polarizer from said first region; and
   neutralizing said photoinduced birefringence by illuminating said light gates with light from said source through said first region while maintaining said polarizer removed from said first region and externally provided electric potentials away from said light gates.

2. In a method of selectively gating light with an array of electrically switchable light gates, the improvement comprising in combination the steps of:
   providing said electrically switchable light gates in an electrooptically active solid-state material displaying field-induced and photoinduced birefringence;
   locating said light gates between a light polarizer situated in a first region and a complementary light analyzer situated in a second region;
   polarizing light with said polarizer;
   providing electric potentials externally of said array of light gates for selectively switching said light gates;
   illuminating said light gates with said polarized light and selectively switching said illuminated light gates through field-induced birefringence by selective application of said electric potentials to said light gates until photoinduced birefringence occurs in said array;
   transmitting gated light from said array through said analyzer in said second region;
   removing said analyzer from said second region; and
   neutralizing said photoinduced birefringence by illuminating said light gates through said second region while maintaining said analyzer removed from said first region and externally provided electric potentials away from said light gates.

3. A method as claimed in claim 1 or 2, including the step of:
   providing a lanthanum modified lead zirconate titanate (PLZT) ceramic as said electrooptically active solid-state material.

4. In apparatus for selectively gating light, the improvement comprising in combination:
   an array of electrically switchable light gates in an electrooptically active solid-state material displaying field-induced and photoinduced birefringence;
   a source of light for illuminating said light gates through a first region;

means for providing electric potentials externally of said array of light gates for selectively switching said light gates;

means for removably mounting a light polarizer in said first region for polarizing light from said source for illumination of said light gates;

an analyzer complementary to said polarizer and situated in a second region spaced from said first region;

means for mounting said array between said first and second regions;

means connected to said means for providing electric potentials and to said light gates for selectively switching said illuminated light gates through field-induced birefringence, including means for selectively applying said electric potentials to said light gates when said polarizer is in said first region, whereby photoinduced birefringence occurs in said array; and means for neutralizing said photoinduced birefringence, including means for temporarily removing said polarizer from said first region for illumination of said light gates with light from said source in circumvention of said polarizer, and means for maintaining externally provided electric potentials away from said light gates during said circumventing illumination.

5. In apparatus for selectively gating light, the improvement comprising in combination:

an array of electrically switchable light gates in an electrooptically active solid-state material displaying field-induced and photoinduced birefringence;

a light polarizer and a complementary light analyzer;

means for mounting said polarizer in a first region;

means for removably mounting said analyzer in a second region spaced from said first region;

means for mounting said array between said first and second regions;

means for illuminating said light gates through said polarizer;

means for providing electric potentials externally of said array of light gates for selectively switching said light gates;

means connected to said means for providing electric potentials and to said light gates for selectively switching said illuminated light gates through field-induced birefringence, including means for selectively applying said electric potentials to said light gates, whereby photoinduced birefringence occurs in said array; and means for neutralizing said photoinduced birefringence, including means for temporarily removing said analyzer from said second region, means for illuminating said light gates through said second region in circumvention of said removed analyzer, and means for maintaining externally provided electric potentials away from said light gates during said circumventing illumination.

6. An apparatus as claimed in claim 4 or 5, wherein: said solid-state material comprises a lanthanum modified lead zirconate titanate (PLZT) ceramic.

* * * * *